(12) United States Patent
Pippus

(10) Patent No.: US 10,363,773 B2
(45) Date of Patent: Jul. 30, 2019

(54) ACCESSORY HOLDER FOR A PAINT TRAY CARRIER

(71) Applicant: Troy Pippus, Winnipeg (CA)

(72) Inventor: Troy Pippus, Winnipeg (CA)

( * ) Notice: Subject to any disclaimer, the term of this patent is extended or adjusted under 35 U.S.C. 154(b) by 0 days.

(21) Appl. No.: 15/971,384

(22) Filed: May 4, 2018

(65) Prior Publication Data

US 2018/0319207 A1 Nov. 8, 2018

Related U.S. Application Data

(60) Provisional application No. 62/501,904, filed on May 5, 2017.

(51) Int. Cl.
  *B44D 3/12* (2006.01)
  *B44D 3/14* (2006.01)
  *F16B 2/22* (2006.01)

(52) U.S. Cl.
  CPC .............. *B44D 3/123* (2013.01); *B44D 3/14* (2013.01); *B44D 3/126* (2013.01); *F16B 2/22* (2013.01)

(58) Field of Classification Search
  CPC .......... B44D 3/126; B44D 3/123; B44D 3/14; F16B 2/20; F16B 2/22
  See application file for complete search history.

(56) References Cited

U.S. PATENT DOCUMENTS

| | | | | |
|---|---|---|---|---|
| 1,643,661 A * | 9/1927 | Kendall | ................ | A47J 43/287 211/65 |
| 2,499,188 A * | 2/1950 | Freeman | ................ | A47G 25/32 211/113 |
| 2,869,812 A * | 1/1959 | Hamel | ................... | A01K 97/10 114/364 |
| 4,991,803 A * | 2/1991 | Buder | .................... | B44D 3/123 248/113 |
| 5,113,549 A * | 5/1992 | Villiano | ................. | B44D 3/126 220/756 |
| 5,502,864 A * | 4/1996 | Sorenson | ............ | B05C 17/0205 15/144.4 |
| 6,052,860 A * | 4/2000 | Coxsey | ................... | A47L 13/52 141/316 |
| D432,404 S * | 10/2000 | Garfinkle | ....................... | D8/395 |
| 7,131,170 B2 * | 11/2006 | Weaver | .................. | A46B 17/02 24/545 |
| 7,527,012 B2 * | 5/2009 | Kutny Splaine | ...... | B63B 25/002 114/343 |
| 7,575,261 B2 * | 8/2009 | Gagne | .................... | B44D 3/126 16/422 |
| 9,440,485 B2 * | 9/2016 | Krusoe | .................... | B44D 3/12 |
| 2006/0261231 A1 * | 11/2006 | Gagne | .................... | B44D 3/126 248/310 |
| 2014/0326838 A1 * | 11/2014 | West | ....................... | H02S 20/20 248/74.2 |

* cited by examiner

*Primary Examiner* — Anita M King
(74) *Attorney, Agent, or Firm* — Ryan W. Dupuis; Ade & Company Inc.; Kyle. R. Satterthwaite

(57) ABSTRACT

An accessory holder is used with a paint tray assembly including a paint tray and a tray carrier releasably attached to the paint tray which includes a post extending upwardly from a base that is releasably clipped onto one end of the paint tray. The accessory holder has a first clip portion adapted to be releasably clamped resiliently and frictionally onto the post of the carrier, and a second clip portion adapted to releasably clamp a painting extension pole therein resiliently and frictionally therein.

15 Claims, 8 Drawing Sheets

ACCESSORY HOLDER FOR A PAINT TRAY CARRIER

This application claims the benefit under 35 U.S.C. 119(e) of U.S. provisional application Ser. No. 62/501,904, filed May 5, 2017.

FIELD OF THE INVENTION

The present invention relates to an accessory holder for supporting various painting accessories on a paint tray carrier, and more particularly, the present invention relates to an accessory holder which can be frictionally clamped onto the upright post of a paint tray carrier and which can support a painting extension pole thereon or other painting accessories hooked thereon.

BACKGROUND

The use of paint trays is well known for applying paint to a paint roller applicator. The paint roller applicator typically has a handle supporting a frame thereon upon which a roller can be rotatably supported. The roller is a cylindrical tube having a paint absorbing material for collecting paint from the paint tray and distributing the paint as the roller is rolled across a surface to be painted. A typical paint tray includes a perimeter wall which is adapted to be supported on a level supporting surface, a paint well supported within the boundary of the perimeter wall so as to be recessed in elevational relative to a top edge of the wall for receiving paint therein, and a ramp within the boundary of the perimeter wall which extends laterally outwardly from the paint well at an upward slope.

Due to the awkwardness of picking up a paint tray from the ground while simultaneously being required to support and carry a paint roller on a painting extension pole as a painter moves about a space to be painted, it is common for painters to make use of a paint tray carrier that allows carrying a paint tray, a paint roller, and a painting extension pole suspended from a single handle grip of the paint tray carrier.

A typical paint tray carrier is illustrated in U.S. Pat. No. 7,575,261 by T.S. Simms & Co. Limited. As illustrated in some embodiments, the paint tray carrier includes (i) a base which can be inserted under a portion of the paint tray, (ii) a post extending upwardly from the base at one end of the paint tray, (iii) a clip which can be selectively fixed to the post to clamp said portion of the paint tray between the base and the clip, (iv) a handle grip extending forwardly from a top end of the post overtop of the paint tray, and (v) a receptor at the end of the handle. The receptor is adapted to cradle a portion of a painting extension pole therein in a stable position when the paint roller at the end of the extension pole rests in the paint tray. Accordingly, a user can grasp the handle grip of the carrier at a central location above the paint tray in a single hand to carry the paint tray, the paint roller and the extension pole as an integral unit.

The typical carrier is only adapted to support the extension pole that is currently in use and attached to the paint roller in the paint tray and no other means are provided to support any additional painting accessories.

SUMMARY OF THE INVENTION

According to one aspect of the invention there is provided an accessory holder for a paint tray assembly in which the paint tray assembly includes (i) a paint tray having a perimeter wall arranged to be supported on a level supporting surface, a paint well supported within the perimeter wall, and a ramp supported within the perimeter wall so as to extend laterally away from the paint well at an upward slope, and (ii) a carrier releasably attached to the paint tray having a base engaged below a portion of the paint tray, a post extending upwardly from the base, and a clip secured to the post so as to clamp said portion of the paint tray between the clip and the base of the carrier, the accessory holder comprising:

a first clip portion adapted to be releasably clamped onto the post of the carrier; and a second clip portion adapted to releasably clamp a painting extension pole therein.

According to a second aspect of the present invention there is provided a paint tray assembly in combination with a painting extension pole, the assembly comprising:

a paint tray having a perimeter wall arranged to be supported on a level supporting surface, a paint well supported within the perimeter wall, and a ramp supported within the perimeter wall so as to extend laterally away from the paint well at an upward slope;

a carrier releasably attached to the paint tray having a base engaged below a portion of the paint tray, a post extending upwardly from the base, and a clip secured to the post so as to clamp said portion of the paint tray between the clip and the base of the carrier; and an accessory holder comprising:
    a first clip portion releasably clamped onto the post of the carrier; and
    a second clip portion releasably clamping the painting extension pole therein.

The use of an accessory holder which is specifically adapted to be secured to the post of a paint tray carrier, together with the configuration of the second clip portion of the accessory holder, readily allows for an auxiliary painting extension pole to be supported securely on the paint tray carrier in addition to a primary extension pole which may be in use with a paint roller and is already supported on the paint tray carrier. The accessory holder supported on the post of the carrier also provides a stable mounting location for supporting various additional painting accessories thereon such as an auxiliary painting can for cutting, a sanding block, and the like.

When the post comprises includes a central web portion and a pair of rear flanges extending laterally outward from opposing sides of the central web portion within a common plane defining a rear side of the post along a length of the post, preferably the first clip portion comprises a main body portion and a pair of laterally opposed hooks which protrude forwardly from the main body portion and which are adapted to be hooked about the free edges of the rear flanges respectively.

The first clip portion may further include a pair of guide surfaces on the opposed hooks respectively, in which each guide surface extends forwardly at an outward slope away from the other guide surface so as to be adapted to guide entry of the rear flanges into the first clip portion.

The second clip portion may be a generally C-shaped member which is biased towards a clamping position adapted to frictionally retain a painting extension pole therein.

The holder preferably further includes at least one accessory hook extending laterally outwardly from the second clip portion having an open top end when the holder is supported on the post of the carrier.

One of the accessory hooks preferably comprises a base member extending generally horizontally outwardly from the second clip portion and a leg member extending generally vertically upwardly from the base member so as to define a rectangular gap between the leg member and the second clip portion which is adapted to receive a sponge sanding block wedged therein.

In the first illustrated embodiment, two accessory hooks are provided on the holder so as to protrude laterally outwardly from opposing sides of the second clip portion. The two hooks may be similar or different in size.

In a further embodiment, the first clip portion may span one side of the post of the tray carrier. In this instance, the post of the tray carrier may include a central web portion, a pair of front flanges extending laterally outward from opposing sides of the central web portion within a common plane defining a front side of the post along a length of the post, and a pair of rear flanges extending laterally outward from opposing sides of the central web portion within a common plane defining a rear side of the post along a length of the post. The first clip portion of the holder may comprise a main body portion arranged to span from one of the front flanges to one of the rear flanges along one side of the post and opposed first and second clip hooks which protrude in a common direction from opposing sides of the main body portion to clamp the post therebetween. The first clip hook preferably has a first portion adapted to span across the front flanges at the front side of the post and a second portion adapted to extend over an edge of the front flange opposite the main body portion. The second clip hook preferably has a first portion adapted to extend over an edge of the rear flange abutting the main body portion. The first clip hook is preferably resiliently coupled to the main body portion so as to be resiliently deflected relative to the main body portion as the first clip portion is mounted onto the post.

BRIEF DESCRIPTION OF THE DRAWINGS

Various embodiments of the invention will now be described in conjunction with the accompanying drawings in which.

In the drawings like characters of reference indicate corresponding parts in the different figures.

DETAILED DESCRIPTION

Figure 1:
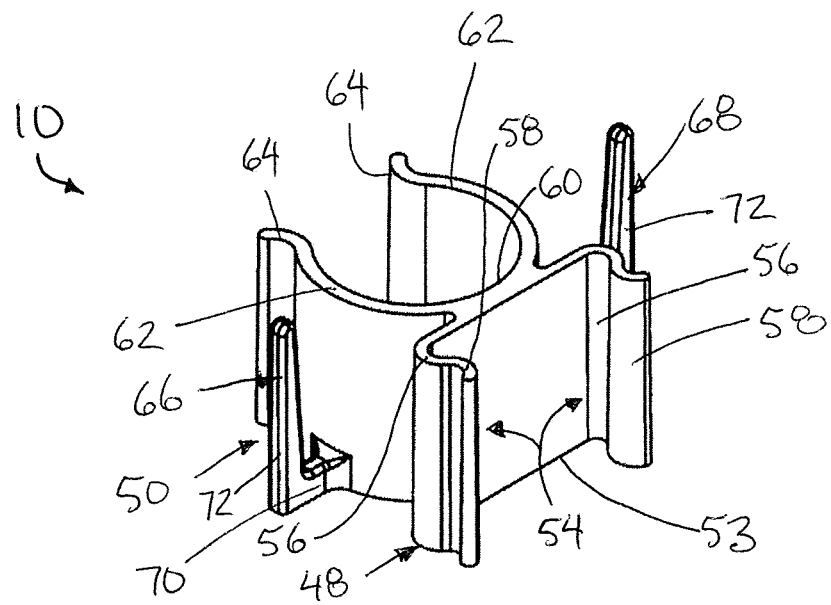
FIG. 1 is a perspective view of a front side the accessory holder for a paint tray carrier according to a first embodiment of the holder.
Figure 2:
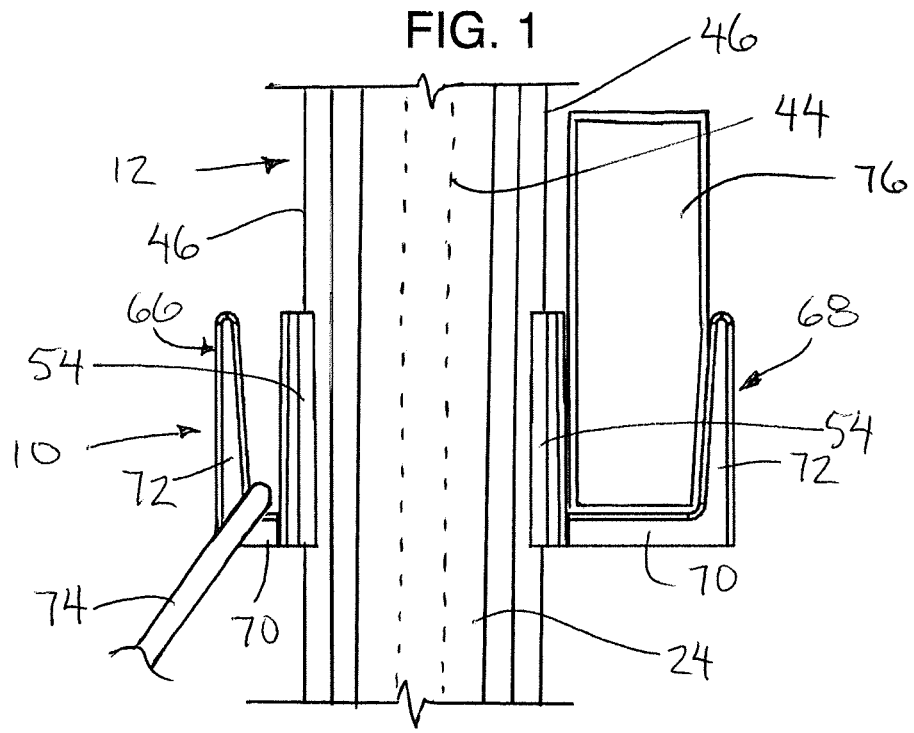
FIG. 2 is a front elevational view of accessory holder according to the first embodiment of FIG. 1.

Referring to the accompanying figures there is illustrated an accessory holder 10 for use with a paint tray carrier 12 that carries a paint tray 14 to form an overall paint tray assembly. The accessory holder 10 is useful for supporting various painting accessories on the paint tray carrier in addition to the paint tray as described in further detail below.

The paint tray 12 of the paint tray assembly typically includes an upright perimeter wall 16 spanning a full height of the paint tray about a generally rectangular perimeter. A bottom edge of the perimeter wall defines the bottom side of the paint tray arranged to be supported on a level supporting surface. A paint well 18 is supported within the boundary of the perimeter wall towards one end of the elongate rectangular shape of the paint tray so as to be reduced in height relative to the top edge of the perimeter wall to form a receptacle for containing paint therein. A ramp 20 of the paint tray, also within the boundary of the perimeter wall, extends laterally outwardly at an upward slope from the paint well 18 towards the opposing end of the elongate rectangular shape of the paint tray in the usual manner of a conventional paint tray.

The paint tray carrier 12 includes a base 22 in the form of a flat plate or foot adapted to be received under the end of the paint tray locating the paint well 18 adjacent thereto. More particularly, the base plate 22 is received under the bottom edge of the perimeter wall at the location of a handle cut-out so as not to interfere with supporting the paint tray in a level orientation on a supporting surface. The base may further include an upstanding portion extending upwardly along an inner side of the perimeter wall 16 between the paint well 18 and the perimeter wall.

The paint tray carrier 12 further includes a post 24 extending upwardly from the base at one end of the paint tray. A handle grip 26 extends forwardly over top of the paint tray at an upward slope to a top end locating a receptor 28 thereon in the form of a generally U-shaped cradle adapted to receive a portion of a painting extension pole 30 recessed therein at a location spaced above the paint tray.

A clip 32 is selectively fixed onto the post 24 using a pin or other suitable releasable latching mechanism which allows the clip to be readily releasable and displaced along the post when desired. The clip 32 functions as the upper portion of a clamp opposite the base 22 forming the opposing lower portion of the clamp to effectively clamp a portion of the paint tray between the clip 32 and the base 22 for fixing the paint carrier to the paint tray. The clip 32 extends over the top edge of the perimeter wall and downwardly along an inner surface of the paint tray towards the paint well in the mounted position.

In addition to coupling to the paint tray for carrying the paint tray, the paint tray carrier 12 also supports a paint roller applicator 34 coupled to the painting extension pole 30 on the paint tray assembly formed by the paint tray and paint tray carrier coupled together. A typical paint roller applicator 34 includes a handle 38 connected to a frame which supports a roller cage 40 rotatably thereon upon which a paint roller tube 42 is mounted for collecting and spreading paint as it is rotated relative to the handle 38. The roller cage 40 rotates about a respective axis oriented perpendicularly to the handle when the handle is mounted in longitudinal alignment with the extension pole 30 upon which it is selectively supported. When supported on the paint tray assembly, the roller tube 42 can rest upon an upper supporting surface of the ramp 20 of the paint tray at a front end of the paint tray opposite from the paint well at the rear end, so that the extension pole 30 extends at an upward and rearward slope to be received within the receptor 28 of the carrier.

The post 24 of the carrier is molded of plastic material having a beam profile of the type comprising a central web portion 44 with laterally protruding flanges which protrude from opposing sides of the central web portion and which extend along the full length of the post between the base at the bottom end and the receptor at the top end of the handle. Two rear flanges 46 protrude laterally outward from opposing sides of the central web portion at the rear side of the post to form a common rear wall lying in a common plane at the rear side of the post upon which the accessory holder 10 is supported. Similarly, two front flanges 47 protrude laterally outward from opposing sides of the central web portion at the front side of the post to form a common front wall lying in a common plane at the front side of the post upon which the accessory holder 10 is supported. The front wall formed by the front flanges 47 is narrower than the rear wall formed by the rear flanges 46.

Several embodiments of the accessory holder are illustrated and described herein; however, in each instance, the accessory holder 10 comprises a singular moulded plastic body which is seamless and unitary in construction.

Figure 7:
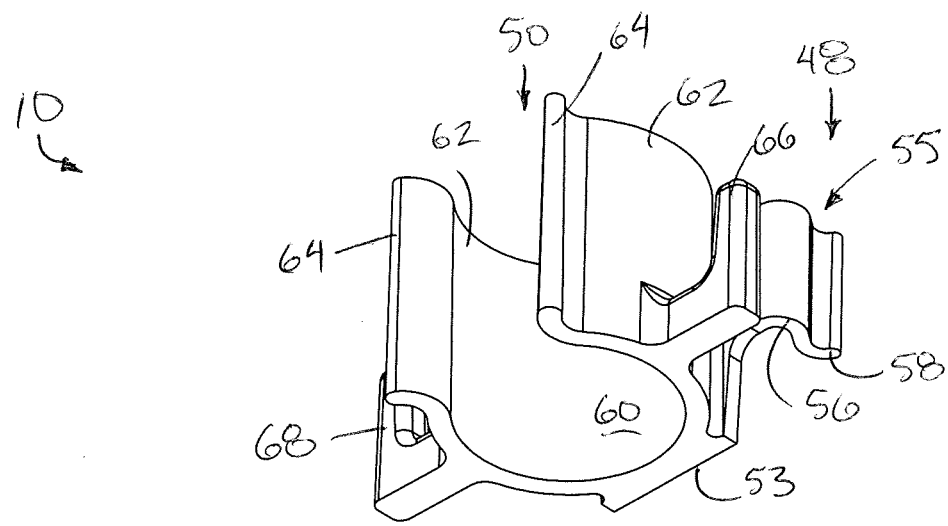
FIG. 7 is a perspective view of bottom and rear side of the accessory holder according to the second embodiment.
Figure 8:
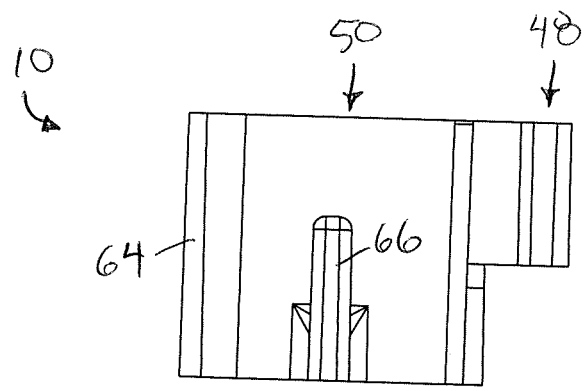
FIG. 8 is a side view of the accessory holder according to the second embodiment of FIG. 7.
Figure 9:
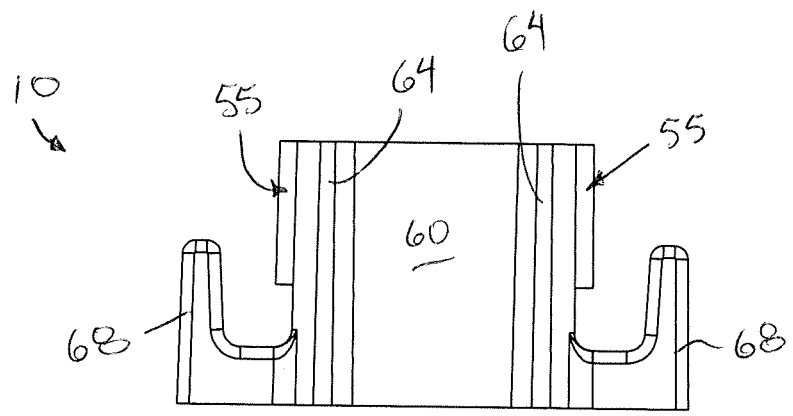
FIG. 9 is a front elevational view of the accessory holder according to the second embodiment of FIG. 7.
Figure 10:
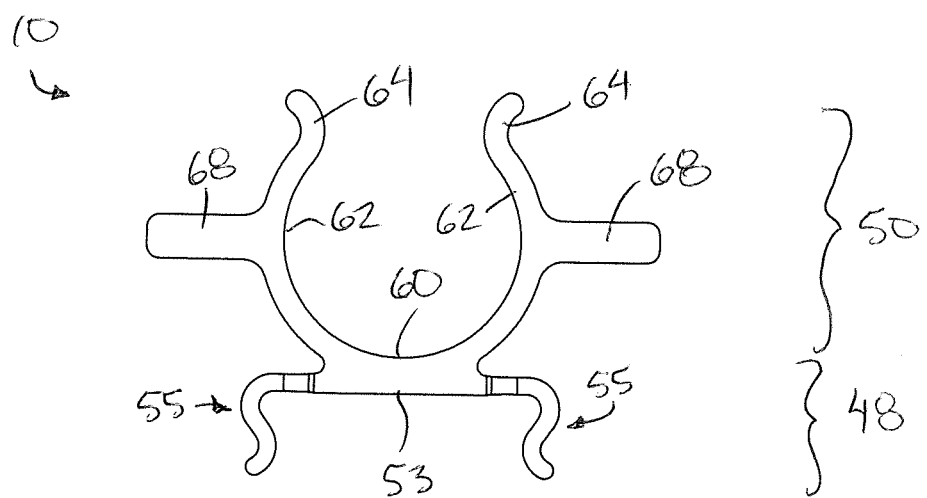
FIG. 10 is a bottom view of the accessory holder according to the second embodiment of FIG. 7.
Figure 12:
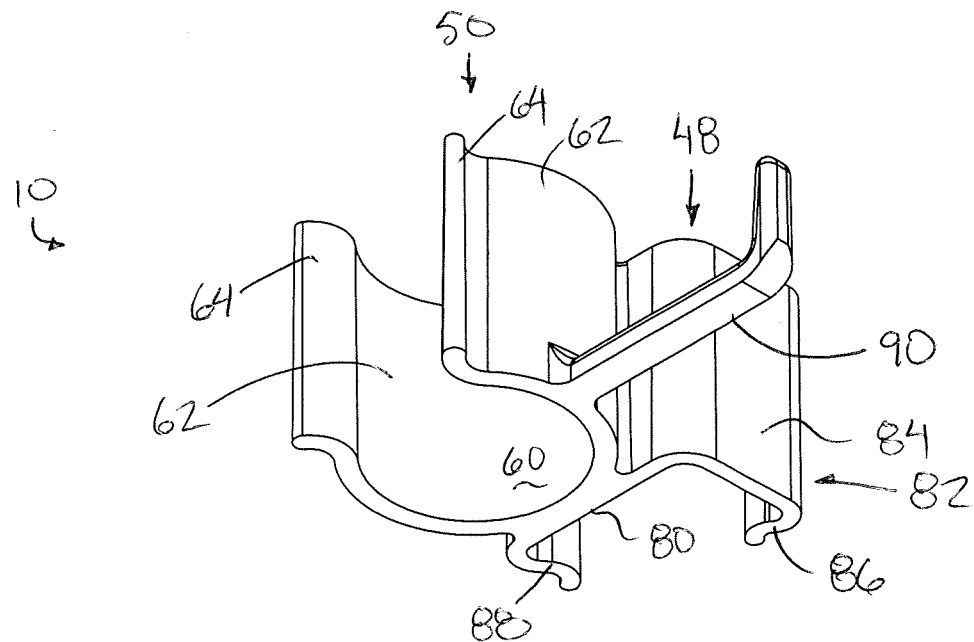
FIG. 12 is a perspective view of bottom and rear side of the accessory holder according to the third embodiment of FIG. 11.
Figure 13:
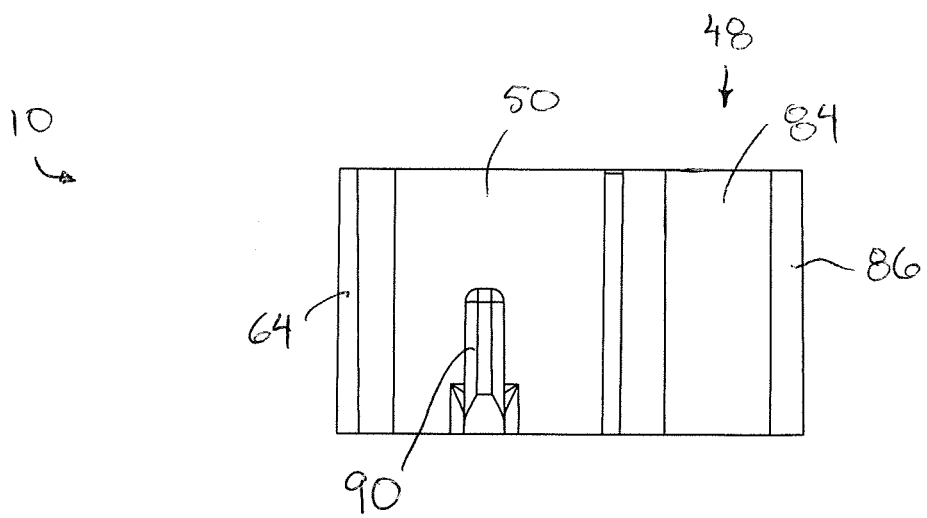
FIG. 13 is a side view of the accessory holder according to the third embodiment of FIG. 11.
Figure 14:
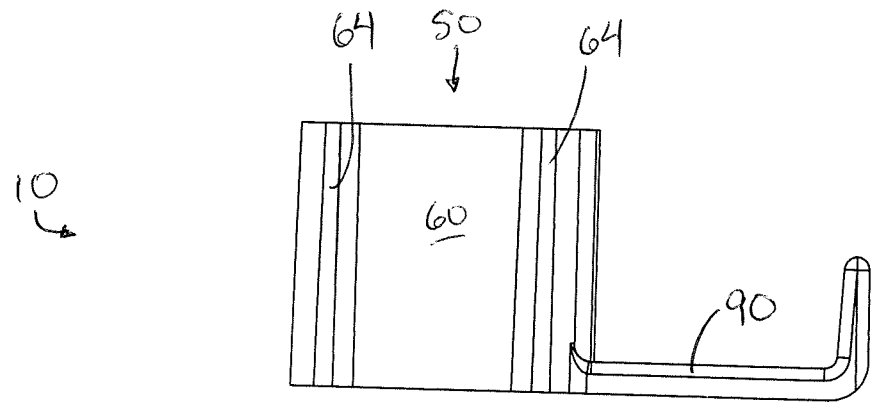
FIG. 14 is a front elevational view of the accessory holder according to the third embodiment of FIG. 11.
Figure 15:
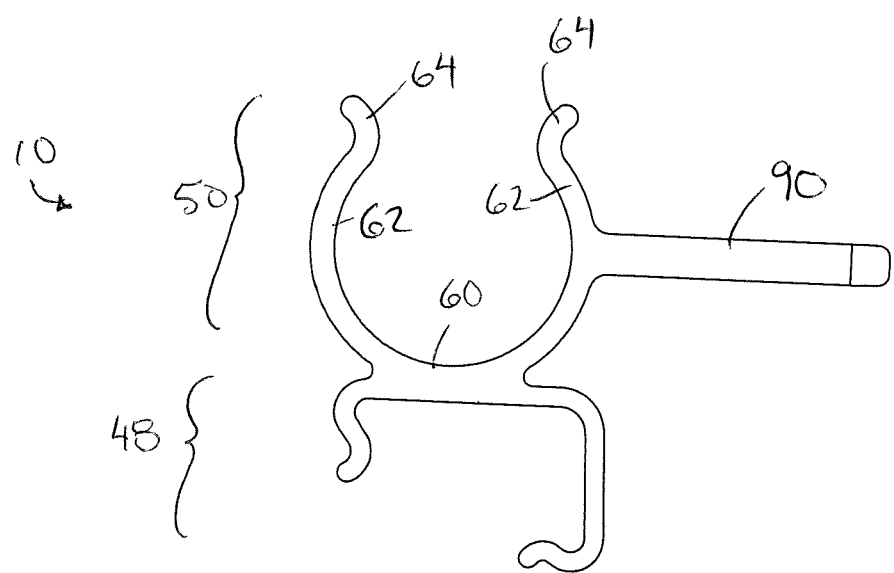
FIG. 15 is a bottom view of the accessory holder according to the third embodiment of FIG. 11.

Turning now more particularly to the first and second embodiments of the holder according to FIGS. 1 and 7 respectively, the body of the holder includes a first clip portion 48 at the front side for selective engagement upon the rear side of the post 24 of the paint carrier and a second clip portion 50 extending rearwardly from the first clip portion in the mounted position for supporting an auxiliary painting pole 52 releasably therein.

The first clip portion 48 includes a base flange 53 which is flat and generally rectangular, having an overall width approximately equal to the width of the rear wall of the post 24 for spanning flat against the rear wall across the full width thereof in a mounted position of the holder. Two retainer hooks 54 protrude forwardly from opposing sides of the base flange 53. Each retainer hook has a generally sinusoidal, S-shaped profile when viewed from above so as to include (i) a first portion 56 of the hook nearest the base flange which is concave at the inner side thereof for wrapping around the free edge of a corresponding one of the two rear flanges 46 of the post, and (ii) a second portion 58 of the hook farthest from the base flange which is convex at the inner side thereof. In this manner, the first portions of the hooks effectively clamp opposing edges of the rear wall of the post and therebetween while the second portions of the hook collectively form a mouth which diverges in the lateral width outwardly away from the base flange to provide suitable guide surfaces which guide the entry of the rear flanges 46 into the retainer hooks 54 respectively by urging the retainer hooks away from one another as the flanges are inserted. Once the rear flanges have been inserted through the mouth between the second portions 58 of the hooks, the material forming the body of the holder has sufficient strength and resilience to bias the retainer hooks to be tightly clamped in frictional engagement across opposing side edges of the rear wall of the post with suitable force to allow the weight of several accessories to be supported on the holder 10 without the holder sliding down along the post.

Each second clip portion 50 is generally C-shaped in profile so as to conform to a portion of the surface of a cylinder. The overall interior diameter is slightly less than the outer diameter of the auxiliary pole 52 so that the pole can be frictionally retained within the clip by outward flexing of the diameter of the second clip portion.

The profile of the second clip portion includes a base portion 60 which is integral and formed as a common wall with the base flange 53 of the first clip portion. The profile further includes two hook portion 62 extending partway about the circumference of the pole 52. The hook portions 62 are symmetrical with one another about a vertical plane oriented in the forward to rearward direction of the holder. The free ends of the two hook portions remain spaced apart to define a circumferential gap therebetween which extends through an arc of approximately 90°. The ends of the hook portions include respective lips 64 formed thereon which taper radially outward at an outward slope away from one another to form respective guide surfaces which assist in flexing the two hook portions away from one another as a pole 52 is inserted into the second clip portion. Again, the material of the holder is such that the second clip portion is biased to return towards an unflexed position of reduced diameter relative to the pole 52, thereby tightly clamping the pole 52 therein to frictionally retain the pole relative to the holder and prevent longitudinally sliding of the pole through the clip portion.

The holder 10 further includes a first accessory hook 66 and a second accessory hook 68 mounted at diametrically opposing sides of the second clip portion of the body of the holder. Accordingly, the hooks are integrally supported on respective ones of the hook portions of the second clip portion. Each accessory hook includes a base member 70 extending horizontally and radially outward from the central axis of the second clip portion at a bottom side of the holder, and a vertical leg member 72 extending vertically upward from the outer end of the base member 70, having an overall height which is approximately equal to the overall height of the first and second clip portions. The vertical leg member 72 is near parallel to the outer surface of the hook portion of the second clip portion 50 of the holder so as to define a generally rectangular shaped gap between the leg member 72 and the second clip portion 50.

According to the first embodiment, the first and second accessory hooks differ in that the first accessory hook 66 has a gap of narrow width in the radial direction compared to the second accessory hook, by having a short base member 72 so as to be suitable for hooking narrow objects thereon. In the illustrated embodiment, the metal wire handle of a conventional paint can be hooked onto the first accessory hook to suspend the paint can from the post of the paint tray carrier. The paint can 74 in this instance is a cutting can only partially filled with a small amount of paint at the bottom of the can so as to be well suited for dipping a paintbrush therein for painting trim and the like.

In contrast, the second accessory hook 68 in the first embodiment has a gap which is wider in the radial direction by having a longer base member 72. The radial width in this instance is slightly less than or nearly equal to the thickness of a conventional sanding block 76 of the type having a rectangular foam core with sandpaper adhered to the exterior surfaces thereof. In this manner, a conventional sanding block can be retained on the second accessory hook 68 by wedging between the vertical leg 72 and the outer surface of the second clip portion 50 at the second accessory hook 68.

According to the first embodiment, the first and second clip portions 48 and 50 span the full height of the holder so as to be substantially coplanar with one another at the respective top edges thereof and so as to be substantially coplanar with one another at the respective bottom edges.

According to the second embodiment of the holder, the second clip portion remains identical to the first embodiment so as to span the full height of the holder; however, the first clip portion 48 is upwardly recessed at the bottom thereof. The bottom of the first clip portion 48 in this instance is located at an intermediate height that is spaced upwardly from the bottom of the second clip portion; however, the top edges of the first and second clip portions remain coplanar with one another in this instance. The overall height of the first clip portion in this instance extends approximately half the overall height of the holder by spanning from a central location to the top of the holder. Although this reduces the clamping force of the holder onto the post of the paint tray carrier, it allows for the clip holder to be located close enough to the bottom of the post that full cans of paint may be hooked onto the accessory hooks such that the bottoms of the cans are engaged upon the base plate 22 of the tray carrier, while sufficient clearance is provided for the clip 32 of the tray carrier to be raised into a released position without interference with the bottom of the first clip portion 48 at the front side of the post.

The holder 10 according to the second embodiment also differs from the first embodiment in that both accessory hooks 66 and 68 are shorter in length so as to be similar to the shorter first accessory hook 66 of the first embodiment. The holder 10 according to the second embodiment is otherwise identical to the holder of the first embodiment, with regard to the shape of the base flange 53, the profile of the retainer hooks 55, and the configuration of the second clip portion 50.

Turning now to the third embodiment of the holder 10, a first clip portion 48 is again provided for clamping frictionally onto the post of the paint tray carrier, and the second clip portion 50 is identical in configuration so as to comprise a base portion 60, to hook portion 62, and lips 64 for receiving a painting pole therein similarly to the previous embodiments. The holder 10 according to the third embodiment however differs in that the first clip portion 48 in this instance is instead adapted for clamping onto the post so that the second clip portion protrudes laterally outwardly from the side of the post.

Similarly to the previous embodiments, the holder 10 according to the third embodiment includes a main body portion 80 integrally formed with the base portion 60 of the second clip portion similarly to the base flange 53 of the previous embodiments. The main body portion 80 differs in that it is a rectangular plate spanning between opposing side edges by a suitable width for spanning along one side of the post of the tray carrier from the free edge of one of the front flanges 47 to the free edge of one of the rear flanges 46 along a common side of the post.

A first clip hook 82 is connected along a forward edge of the main body portion 80 so as to be hooked over and across the front side of the post, by including a first portion 84 spanning the full width across both front flanges 47 and a second portion 86 formed as a lip protruding from the first portion 84 opposite the main body portion 80 for hooking over the edge of the front flange 47 opposite the main body portion. The main body portion 80, the first portion 84 of the first clip hook, and the second portion 86 of the first clip hook together form a generally U-shaped structure extending around the front side of the post with close tolerances between the dimensions of the first clip hook and the front wall defined by the front flanges 47 of the post to frictionally grip the front side of the post within the first clip hook. The second portion 86 of the first clip hook has a sinusoidal profile with a first concave portion and a second convex portion along the inner surface thereof for more readily accepting insertion of the front flanges into the first clip hook similarly to the similar surfaces on the retainer hooks 55 according to the previous embodiments.

A second clip hook 88 extends from the main body portion 80 opposite the first clip hook. The second clip hook 88 is adapted to a hook over the rear side of the edge of the rear flange abutted to the main body portion 80. The second clip hook 88 is also generally S-shaped including a first inner portion which is concave at the inner side thereof joining a second outer portion which is convex at the inner side thereof for ease of insertion over the edge of the rear flange upon which it is engaged in the mounted position similarly to the configuration of the retainer hooks 55 according to the previous embodiment.

In a relaxed state, the first portion 84 of the first clip hook and the main body portion 80 are nearer perpendicular to one another, however the first clip hook can be resiliently deflected relative to the main body portion to form an interior angle therebetween of greater than 90° once clipped onto the post of the tray carrier. By resiliently deflecting the first and second clip hooks outwardly relative to one another once the post is inserted into the first clip portion 48, the resilient deflection produces biases forces to return the clip to a relaxed state which provides additional clamping force so that the post is wedged into the first clip portion 48 to frictionally retain the holder 10 at a fixed location along the post of the tray carrier.

According to the third embodiment, a single accessory hook 90 protrudes forwardly from only one of the hook portions 62 of the second clip portion 50 in the mounted position for supporting additional painting accessories thereon. The accessory hook 90 includes a base member 70 and the leg member 72 similar to the accessory hooks 66 and 68.

When using the holders 10 according to the first and second embodiments, a paint tray carrier is first coupled to a paint tray so that the handle at the top end thereof extends forwardly over top of the tray. The holders 10 according to the first embodiment and the second embodiment are then mounted on the post of the paint tray carrier by resiliently deforming the retainer hooks until the rear flanges 46 of the post are received within respective ones of the retainer hooks 54 and the biasing of the retainer hooks to return to a non-flexed position sufficiently frictionally clamp the holder 10 relative to the post at a location spaced above the tray. The holders are oriented such that the hooks of the first clip portion of the holder project forwardly into engagement with the rear side of the post while the hook portions of the second clip portion 50 protrude rearwardly for receiving an auxiliary extension pole therein. The holder 10 according to the first embodiment is suited for being mounted on the post closer to the top end thereof. The holder 10 according to the second embodiment is particularly suited for being mounted on the post at an intermediate location closer to the bottom of the post, but at a location spaced upwardly from the clamped location of the clip that slides along the post of the tray carrier. The upwardly recessed configuration of the first clip portion 48 according to the second embodiment of the holder allows the clip of the tray carrier to be slidably displacement into overlapping configuration with the holder 10 along the post without interference for releasing the tray from the tray carrier without removing the holders from the tray carrier.

Figure 3:
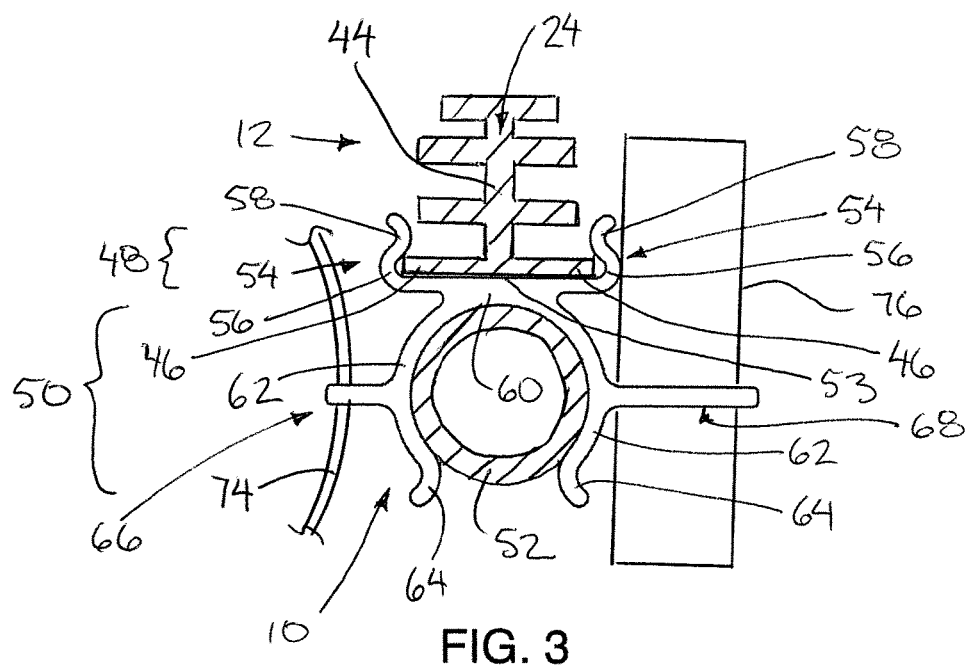
FIG. 3 is a bottom plan view of the accessory holder according to the first embodiment of FIG. 1.
Figure 4:
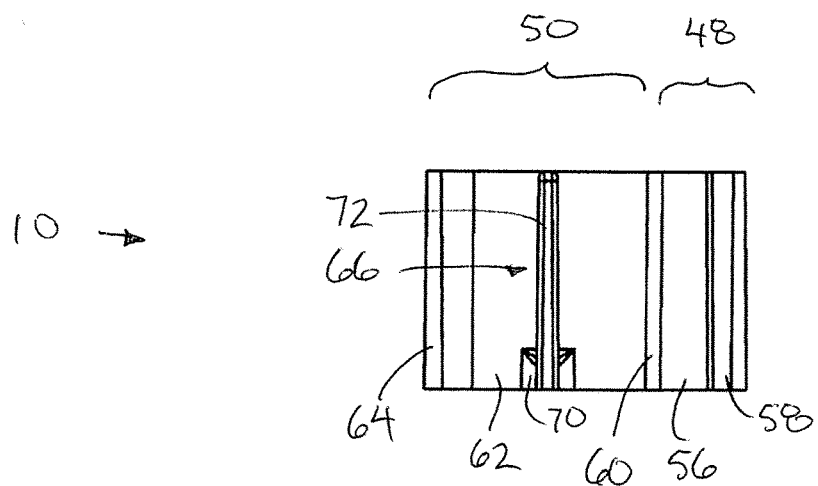
FIG. 4 is a right side view of the accessory holder according to the first embodiment of FIG. 1.
Figure 5:
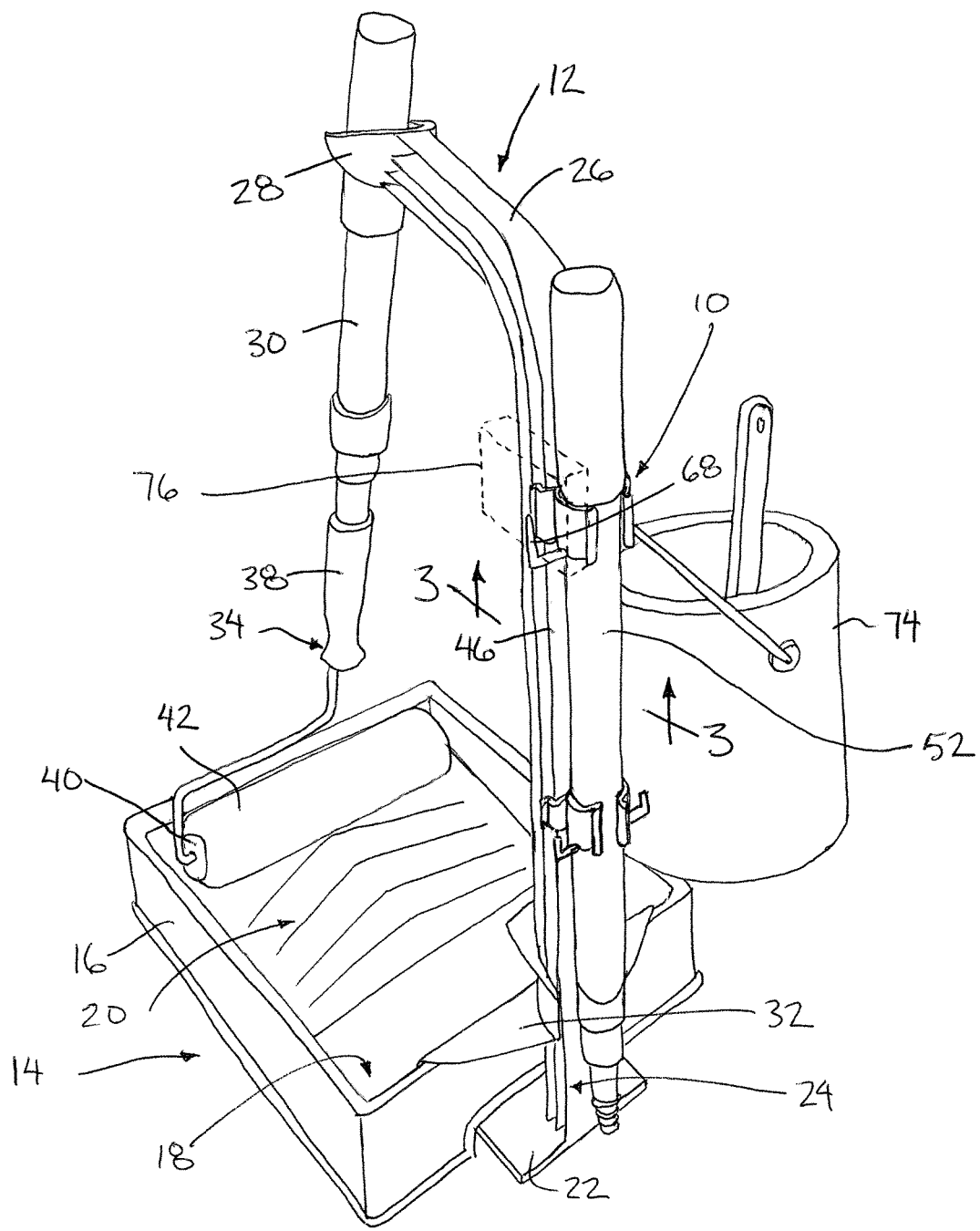
FIG. 5 is a perspective view of a rear side of a paint tray carrier that has a paint tray, paint roller and a painting extension pole supported thereon to collectively form a paint tray assembly in which the first embodiment and a second embodiment of the accessory holder are shown supported on the upright post of the paint tray carrier.
Figure 6:
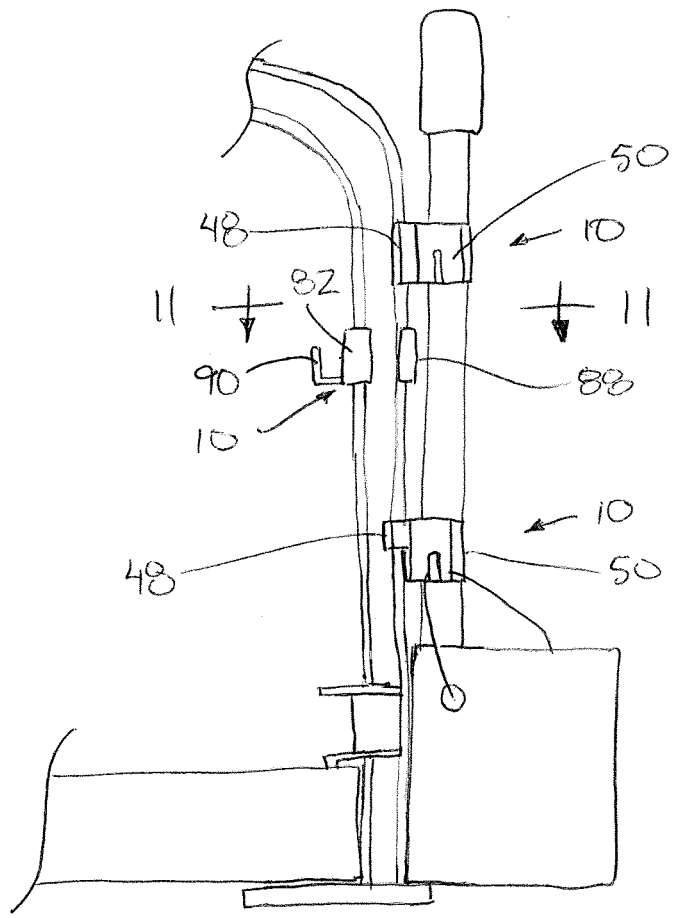
FIG. 6 is a side view of the paint tray according to FIG. 5 shown supporting the first embodiment of the accessory holder, the second embodiment of the accessory holder, and a third embodiment of the accessory holder thereon.
Figure 11:
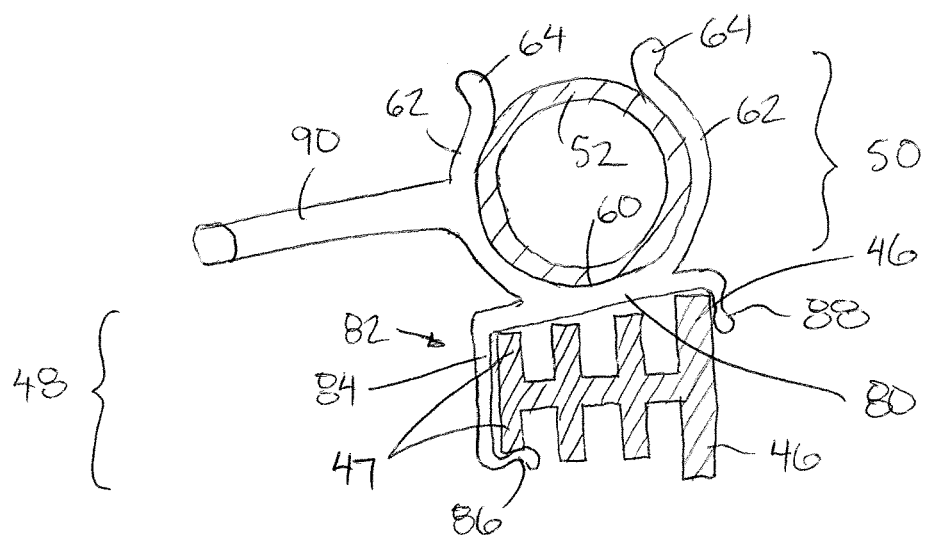
FIG. 11 is a sectional view along the line 11-11 in FIG. 6, illustrating the third embodiment of the accessory holder.

The holder 10 according to the third embodiment can be mounted at an intermediate height along the post between the first and second holders. The third holder 10 is mounted to support an additional painting pole 52 alongside the post of the tray carrier in addition to a first pole along the rear side of the pole according to FIG. 3.

A cutting can and a sanding block can then be supported on the respective accessory hooks of the uppermost holder.

Furthermore, a pair of full paint cans can be hooked onto the accessory hooks of the lowermost holder 10.

In addition, a paint roller on a respective extension pole can be supported in the usual manner on the paint tray by engaging the extension pole of the paint roller within the receptor of the carrier. The user can then grab the handle 26 at the top end of the carrier to allow all accessories to be carried on the paint tray carrier grasped in a single hand of the user.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. An accessory holder in combination with a painting extension pole and a paint tray assembly in which the paint tray assembly includes (i) a paint tray having a perimeter wall arranged to be supported on a level supporting surface, a paint well supported within the perimeter wall, and a ramp supported within the perimeter wall so as to extend laterally away from the paint well at an upward slope, and (ii) a carrier releasably attached to the paint tray having a base engaged below a portion of the paint tray, a post extending upwardly from the base, and a clip secured to the post so as to clamp said portion of the paint tray between the clip and the base of the carrier, the accessory holder comprising:
    a first clip portion releasably clamped onto the post of the carrier;
    a second clip portion releasably clamping the painting extension pole therein; and
    an accessory hook extending laterally outwardly from the second clip portion having an open top end when the holder is supported on the post of the carrier;
    the accessory hook comprising a base member extending horizontally outwardly from the second clip portion and a leg member extending vertically upwardly from the base member so as to define a rectangular shaped gap between the leg member and the second clip portion.

2. The holder according to claim 1 wherein the second clip portion is a generally C-shaped member which is biased towards a clamping position adapted to frictionally retain the painting extension pole therein.

3. An accessory holder in combination with a painting extension pole and a paint tray assembly in which the paint tray assembly includes (i) a paint tray having a perimeter wall arranged to be supported on a level supporting surface, a paint well supported within the perimeter wall, and a ramp supported within the perimeter wall so as to extend laterally away from the paint well at an upward slope, and (ii) a carrier releasably attached to the paint tray having a base engaged below a portion of the paint tray, a post extending upwardly from the base, and a clip secured to the post so as to clamp said portion of the paint tray between the clip and the base of the carrier, the accessory holder comprising:
    a first clip portion releasably clamped onto the post of the carrier; and
    a second clip portion releasably clamping the painting extension pole therein;
    wherein the post includes a central web portion and a pair of rear flanges extending laterally outward from opposing sides of the central web portion within a common plane defining a rear side of the post along a length of the post; and
    wherein the first clip portion comprises a main body portion and a pair of laterally opposed hooks which protrude forwardly from the main body portion and which are adapted to be hooked about the free edges of the pair of rear flanges respectively.

4. The holder according to claim 3 further comprising at least one accessory hook extending laterally outwardly from the second clip portion having an open top end when the holder is supported on the post of the carrier.

5. The holder according to claim 4 wherein said at least one accessory hook comprises a base member extending generally horizontally outwardly from the second clip portion and a leg member extending generally vertically upwardly from the base member so as to define a rectangular gap between the leg member and the second clip portion.

6. The holder according to claim 4 wherein said at least one accessory hook comprises a pair of accessory hooks protruding laterally outwardly from opposing sides of the second clip portion.

7. The holder according to claim 6 wherein the pair of accessory hooks are identical to one another.

8. The holder according to claim 6 wherein the pair of accessory hooks are different in size relative to one another and wherein one of the accessory hooks includes a base member extending generally horizontally outwardly from the second clip portion and a leg member extending generally vertically upwardly from the base member so as to define a rectangular gap between the leg member and the second clip portion which is sized to receive a sponge sanding block wedged therein.

9. The holder according to claim 3 wherein the first clip portion further comprises a pair of guide surfaces on the laterally opposed hooks respectively, each guide surface extending forwardly at an outward slope away from the other guide surface so as to be adapted to guide entry of the rear flanges into the first clip portion.

10. The holder according to claim 3 wherein each of the first clip portion and the second clip portion span a full height of the holder.

11. The holder according to claim 3 wherein the first clip portion has a bottom which is spaced above a bottom of the second clip portion.

12. An accessory holder in combination with a painting extension pole and a paint tray assembly in which the paint tray assembly includes (i) a paint tray having a perimeter wall arranged to be supported on a level supporting surface, a paint well supported within the perimeter wall, and a ramp supported within the perimeter wall so as to extend laterally away from the paint well at an upward slope, and (ii) a carrier releasably attached to the paint tray having a base engaged below a portion of the paint tray, a post extending upwardly from the base, and a clip secured to the post so as to clamp said portion of the paint tray between the clip and the base of the carrier, the accessory holder comprising:
- a first clip portion releasably clamped onto the post of the carrier; and
- a second clip portion releasably clamping the painting extension pole therein;
- the post including a central web portion, a pair of front flanges extending laterally outward from opposing sides of the central web portion within a common plane defining a front side of the post along a length of the post, and a pair of rear flanges extending laterally outward from opposing sides of the central web portion within a common plane defining a rear side of the post along a length of the post;
- the first clip portion comprises a main body portion arranged to span from one of the front flanges to one of the rear flanges along one side of the post, and opposed first and second clip hooks which protrude in a common direction from opposing sides of the main body portion to clamp the post therebetween;
- the first clip hook having a first portion adapted to span across the front flanges at the front side of the post and a second portion adapted to extend over an edge of the front flange opposite the main body portion; and
- the second clip hook having a first portion adapted to extend over an edge of the rear flange abutting the main body portion.

13. The holder according to claim 12 wherein the first clip hook is resiliently coupled to the main body portion so as to be resiliently deflected relative to the main body portion as the first clip portion is mounted onto the post.

14. The holder according to claim 12 further comprising an accessory hook extending laterally outwardly from the second clip portion having an open top end when the holder is supported on the post of the carrier.

15. The holder according to claim 14 wherein the accessory hook comprises a base member extending generally horizontally outwardly from the second clip portion and a leg member extending generally vertically upwardly from the base member so as to define a rectangular gap between the leg member and the second clip portion.

\* \* \* \* \*